United States Patent [19]

Debayeux et al.

[11] 4,337,722

[45] Jul. 6, 1982

[54] APPARATUS FOR GRANULATING AND/OR COATING PARTICLES IN A SPOUTED BED

[75] Inventors: Christian Debayeux, Toulouse; Hubert Lacroix, Villeneuve Tolosane; Felix Sternicha, Toulouse, all of France

[73] Assignee: Societe Chimique des Charbonnages, Paris, France

[21] Appl. No.: 212,046

[22] Filed: Dec. 1, 1980

[30] Foreign Application Priority Data

Nov. 30, 1979 [FR] France ............................. 79 29462

[51] Int. Cl.³ .......................... B01J 2/16; B05C 5/00
[52] U.S. Cl. ............................ 118/303; 118/DIG. 5; 427/213
[58] Field of Search ............ 118/303, 62, 24, DIG. 5; 427/213

[56] References Cited

U.S. PATENT DOCUMENTS 3,110,626 11/1963 Larson ................................. 118/24
3,231,413 1/1966 Berguin ............................... 118/303

FOREIGN PATENT DOCUMENTS 2418669 9/1979 France .

Primary Examiner—Ralph S. Kendall
Attorney, Agent, or Firm—Millen & White

[57] ABSTRACT

An apparatus for granulating and/or coating particles in a spouted bed having a cylindrically shaped enclosure surrounding and extending upward from a downwardly converging frustoconical structure connected to a gas flow conduit. A downwardly inclined flange extends from the walls of the cylindrical portion to overlap the top of the frustoconical part defining an annularly extending gap therebetween for allowing finished granules to exit therethrough.

5 Claims, 1 Drawing Figure

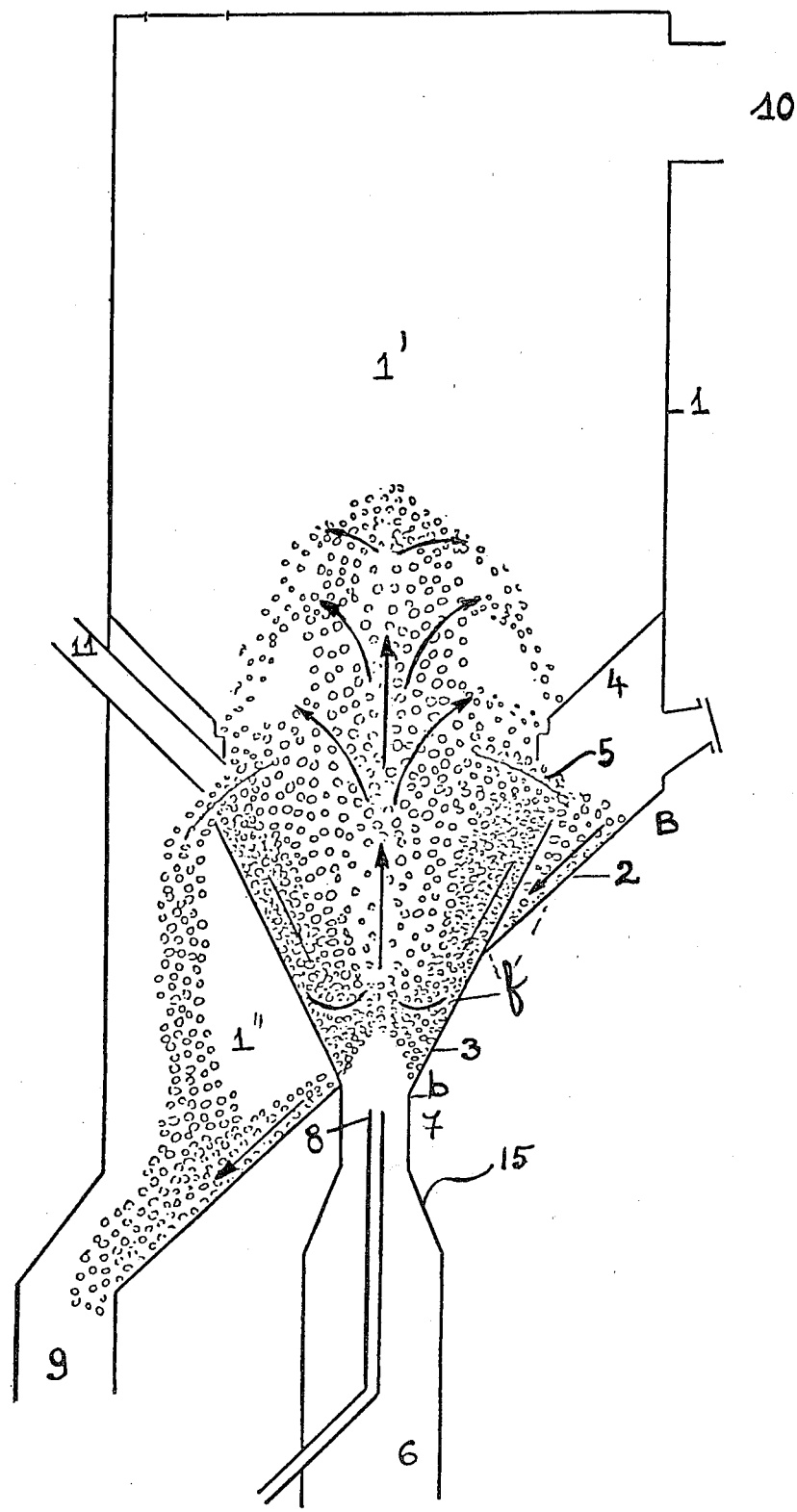

APPARATUS FOR GRANULATING AND/OR COATING PARTICLES IN A SPOUTED BED

BACKGROUND OF THE INVENTION

The present invention concerns an improved apparatus for granulating and/or coating solid particles in a spouted bed.

Spouted beds are beds of particles obtained in an enclosure having a vertical axis and fitted at the lower part with a frustoconical part terminating at a bottom opening through which is introduced an upwardly directed gaseous flowstream. The upwardly directed gaseous flowstream maintains the particles in suspension and carries them along closed paths. Thus, the particles are directed upwardly by the gaseous flowstream in close proximity to the axis of the enclosure in the shape of a spout or geyser. The particles move radially toward the walls of the enclosure and then slowly return downward until they arrive at the top of the frustoconical part. Spouted beds of this type are described in French Pat. No. 1,125,461 filed on Mar. 11, 1955 and assigned to the National Research Council.

It is well known to use spouted beds for granulating fluid products which are hardenable either by evaporating water or another solvent or by cooling and/or for coating previously prepared particles or cores with these hardenable fluid products. According to the known granulating processes, a spouted bed of forming granules or of particles to be coated, is maintained by means of a hot or cold upwardly travelling gaseous flowstream with the hardenable product atomized in the gaseous flowstream beneath the spouted bed. The hardenable product is partly evaporated or cooled in the gaseous stream and deposits on the particles of the spouted bed located in the lower part of the frustoconical part. The deposited atomized product continues evaporating or cooling until solidification is obtained, while the particles are again carried upward by the gaseous flowstream within the axially directed spout, and while they return downwardly along the walls of the enclosure. When the particles again reach the lower part of the frustoconical part of the enclosure, they receive a new coating of the atomized product.

Granulation and/or coating is thus made by successively depositing the atomized hardenable product. Such a granulating process is described in U.S. Pat. No. 3,231,413 filed on Jan. 25, 1966 and is assigned to Potasse et Engrais Chimiques.

The apparatuses used up to now for granulating in a spouted bed include an enclosure having a vertical axis which has a cylindrically shaped part with a frustoconical part connected to the lower portion thereof.

For continuous operation, the apparatus includes a laterally extending overflow at the upper portion of the spouted bed in the cylindrical port for drawing granules off continuously. The gaseous stream is introduced through the small base of the frustoconical part of the enclosure. The spray nozzle for the coating product or for the product to be granulated is positioned in proximity to the frustoconical part of the enclosure.

It has been difficult to maintain a homogeneous bed with the prior art apparatuses, especially when using an apparatus having a diameter greater than, for example, 1 meter. As a result of maintaining a gaseous rate necessary for obtaining steady spouting conditions, large granules are often carried up to the cyclone dust collectors. The recycling ratio is therefore very high. Additionally, the bed is more likely to jam through the formation of granules which are too large.

SUMMARY OF THE INVENTION

An object of the present invention is to provide an improved apparatus which allows the continuous operation of spouted bed apparatuses having a diameter greater than 1 meter while maintaining a homogeneous spouted bed.

The present invention concerns an improved apparatus for granulating and/or coating solid particles in a spouted bed comprising an enclosure having a vertical axis including a frustoconical part surrounded and topped by a coaxially extending cylindrical part, an outlet for processed granules, a gas feeding conduit pipe coaxially connected to the smaller base portion of the frustoconical part, and a spray nozzle coaxially positioned adjacent the smaller end of the frustoconical part. The cylindrical part is closed at its lower end by an inclined floor, the frustoconical part is at least partly set inside the cylindrical part and there is a recentering frustoconical flange attached to the cylindrical part above the frustoconical part for defining an annularly extending spacing between the recentering flange and the frustoconical part.

Upon further study of the specification and appended claims, further objects and advantages of this invention will become apparent to those skilled in the art.

BRIEF DESCRIPTION OF THE FIGURE

The invention will be more fully understood in the following detailed description taken with reference to the attached FIGURE which is a schematic sectional view of an apparatus according to the present invention.

DETAILED DESCRIPTION OF THE INVENTION

The apparatus comprises a cylindrical shaped enclosure 1 which is closed at its lower end by an inclined floor 2. The floor 2 is partially intersected by a frustoconical part 3 which has the larger end B located inside the cylindrical part 1.

The smaller lower end b may be outside the cylindrical part 1, partly inside and partly outside or, as illustrated in the FIGURE, totally outside. As can be seen from the drawing, the frustoconical part 3 is independent from the cylindrical part 1 and can be easily changed.

By making the frustoconical part 3 independent, maintenance of the apparatus is facilitated. Furthermore, it is easier to adapt the apparatus to the treatment of different substances by attaching frustoconical parts having different angles of inclination according to need. Above the frustoconical part 3 there is a recentering flange 4 which also has a frustoconical shape and is attached to the wall of the cylindrical part 1 at a level such that a gap 5 is defined between the lower edge of the recentering flange 4 and the upper edge of the frustoconical part 3.

The recentering flange 4 and the frustoconical part 3 divide the cylindrical part 1 into an upper half 1' and a lower half 1''. The lesser diameter base end of the frustoconical part 3 is connected to a gas feeding conduit tube 6 which includes a frustoconical part 15. According to the embodiment illustrated in FIG. 1, the connection between the smaller end b and conduit pipe 6 includes cylindrically shaped neck 7 which is connected by a converging portion 15. This cylindrically shaped neck 7 can be eliminated however, as long as the connection between the conduit pipe 6 and the frustoconical part 3 comprises a convergent-divergent flow system. The spray nozzle 8 is positioned adjacent the smaller end b. In the lower part of the lower half 1″ of the cylindrical part 1 is attached an outlet pipe 9 for removing the finished granules. At the upper half 1′ of the cylindrical part is attached an outlet pipe 10 for the inflowing gas. Recycled granules are introduced through conduit 11 which opens above and/or below the recentering flange 4.

The apparatus operates as follows. The gaseous upwardly directed stream is introduced through conduit pipe 6 and maintains the granules in the form of a spouted bed. The circulation of the granules in the spouted bed is shown on FIG. 1 by arrows f. As can be seen from the FIGURE, the main part of the spouted bed is located within the frustoconical part 3 and only the axially extending central spout reaches the upper half 1′ of the cylindrical part 1. The particles of this spout are brought back onto the bed by the recentering flange 4. As a result of the upper half 1′ of the cylindrical enclosure having a larger diameter than that of the diameter of large end B of the frustoconical part 3, the gaseous flowstream is slowed greatly when it enters into the half 1′. The proportion of fine particles which are carried away by the gaseous stream is therefore greatly decreased. The granules continuously overflow through annular gap 5 above the edge of the large end B of the frustoconical part 3. Subsequently, the granules fall into the half 1″ of the cylindrical part 1. In the apparatus illustrated on FIG. 1, the floor 2 is made of a non perforated sheet of metal and the particles roll on it toward the outlet pipe 9. The floor can also be made of a sieve for preclassifying the granules. As is well known, the extracted granules are classified in order to separate the granules of commercial size from fine and large granules. The large granules are crushed and recycled with the fines and introduced through conduit 11.

Without further elaboration, it is believed that one skilled in the art can, using the preceding description, utilize the present invention to its fullest extent. The previously described preferred specific embodiment is, therefore, to be construed as merely illustrative, and not limitative of the remainder of the disclosure in any way whatsoever.

In the comparative example described hereinafter the tests were performed in an apparatus made out of glass and having a diameter of 70 centimeter. The tests were performed with molten sulfur, all the conditions of rate, temperature, pressure, and level of the spray nozzle being the same. The table set forth below shows the granulometry of the product obtained with a device having a radial outlet as described in French Pat. Nos. 1,275,463 and 1,354,758 and corresponding U.S. Pat. No. 3,231,413 and having concentrical overflow according to the present invention.

| Granulometry G in mm | $2 \leq G < 4.7$ | $G < 2$ |
| --- | --- | --- |
| Radial outlet | 50% | 50% |
| Concentrical overflow | 80% | 20% |

The preceding example can be repeated with similar success by substituting the generically or specifically described operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An apparatus for granulating and/or coating solid particles in a spouted bed comprising: a downwardly converging frustoconically shaped hollow body having a hollow cylindrically shaped body mounted coaxially around and extending upward therefrom, said hollow cylindrically shaped body having an outlet connected thereto for appropriately shaped granules; a gas feed conduit coaxially attached to said frustoconically shaped hollow body at the bottom smaller end thereof; a spray nozzle positioned coaxially within said gas feed conduit adjacent said bottom smaller end of said frustoconically shaped hollow body; a downwardly inclined recentering flange attached to the inside walls of said hollow cylindrically shaped body, said flange extending so as to overlap said frustoconically shaped body so as to define an annularly extending gap around the top edge of said frustonically shaped body and said flange for providing an outlet for finished granules; and an inclined bottom floor attached to said cylindrically shaped body and to the extension of said frustoconically shaped body for closing off the bottom of said cylindrically shaped body.

2. An apparatus as in claim 1 wherein the diameter of said gas flow conduit is greater than 1 meter.

3. An apparatus as in claim 1 further comprising an outlet pipe connected to said cylindrically shaped body outside said frustoconically shaped body for removing said finished granules travelling through said gap.

4. An apparatus as in claim 1 further comprising a refeed conduit attached to said cylindrically shaped body above said frustoconically shaped body and extending thereinto for reintroducing recycled granules.

5. An apparatus as in claim 1 wherein said inclined bottom floor includes perforations.

* * * * *